United States Patent
Young

(10) Patent No.: US 9,091,277 B1
(45) Date of Patent: Jul. 28, 2015

(54) SYSTEMS AND METHODS FOR MANUFACTURING A SHROUDED IMPELLER

(71) Applicant: Computer Assisted Manufacturing Technology Corporation, Irvine, CA (US)

(72) Inventor: Lance A. Young, San Clemente, CA (US)

(73) Assignee: Computer Assisted Manufacturing Technology Corporation, Irvine, CA (US)

( * ) Notice: Subject to any disclaimer, the term of this patent is extended or adjusted under 35 U.S.C. 154(b) by 0 days.

(21) Appl. No.: 14/261,918

(22) Filed: Apr. 25, 2014

(51) Int. Cl.
F04D 29/22 (2006.01)
B23P 15/04 (2006.01)

(52) U.S. Cl.
CPC ............. F04D 29/2222 (2013.01); B23P 15/04 (2013.01)

(58) Field of Classification Search
CPC ..... F04D 29/18; F04D 29/22; F04D 29/2205; F04D 29/2222; B21D 52/267; B23P 15/006
USPC ............. 416/178, 180, 181, 214 R; 29/889.2, 29/889.4
See application file for complete search history.

(56) References Cited

U.S. PATENT DOCUMENTS

| | | |
|---|---|---|
| 2,323,637 A | 8/1940 | Williams |
| 3,257,071 A | 6/1966 | Harris |
| 4,155,151 A | 5/1979 | Stiegelmeier |
| 4,241,720 A | 12/1980 | Kitchen |
| 4,706,928 A | 11/1987 | Hyll |
| 4,732,541 A | 3/1988 | Hyll |
| 5,438,755 A | 8/1995 | Giberson |
| 6,082,000 A | 7/2000 | Fornasa |
| RE37,233 E | 6/2001 | Chancellor |
| 6,276,899 B1 | 8/2001 | Lambert |
| 7,305,762 B2 | 12/2007 | Mola |
| 7,452,187 B2 | 11/2008 | Baker |
| 8,128,865 B2 | 3/2012 | Jahnz et al. |
| 8,426,766 B2 | 4/2013 | Tsukamoto et al. |
| 8,439,642 B2 | 5/2013 | Scott |
| 2010/0008775 A1 | 1/2010 | Vedsted et al. |
| 2010/0077586 A1 | 4/2010 | Haehnle et al. |
| 2010/0242280 A1* | 9/2010 | Adachi et al. ................ 29/889.7 |
| 2011/0129344 A1 | 6/2011 | Burgess |
| 2011/0318183 A1 | 12/2011 | Noronha |
| 2013/0052018 A1 | 2/2013 | Jones et al. |
| 2013/0078099 A1* | 3/2013 | Ahn .............................. 416/182 |

FOREIGN PATENT DOCUMENTS

| | | |
|---|---|---|
| EP | 2402112 A2 | 4/2012 |
| JP | 2002364588 A | 12/2002 |
| KR | 101185717 B1 | 9/2012 |
| WO | 2013009193 A1 | 1/2013 |

* cited by examiner

Primary Examiner — Nathaniel Wiehe
Assistant Examiner — Jeffrey A. Brownson
(74) Attorney, Agent, or Firm — Fish & Tsang LLP

(57) ABSTRACT

Multipart shrouded impellers and methods for manufacturing multi-part shrouded impellers are described. Components of the shrouded impeller include alignment features that, when brought into contact, provide concentric and spatial alignment of the component parts. Upon alignment a gap remains between portions of the components, which permits the introduction of a filler material that joins the components into a unitized whole.

8 Claims, 9 Drawing Sheets

SYSTEMS AND METHODS FOR MANUFACTURING A SHROUDED IMPELLER

FIELD OF THE INVENTION

The field of the invention is systems and methods for manufacturing turbomachinery components, in particular shrouded impellers.

BACKGROUND

Impellers are devices that are widely used in pumping devices, where rotation of the impeller applies pressure to a fluid. Such pumping devices are used in a variety of applications related to pressurization of fluids, including circulation of fluids in closed systems, gas compression, liquid delivery, refrigeration, and propulsion. Both open and closed (i.e., shrouded) impeller designs are known. Closed or shrouded impellers are more difficult to manufacture, however their use is often desired due to their higher efficiency.

A shrouded impeller can be manufactured as an integrated, unitary device or can be assembled from individual components. Integrated, unitary impellers have the advantage of lacking welds, seams, and other manufacturing artifacts that interfere with fluid flow and can be sources of mechanical failure. Manufacture of such unitary shrouded impellers (as disclosed in U.S. Pat. No. 7,3054,762, to Mola) can, however, be an expensive and time consuming process requiring the use of specialized tools capable of reaching deep into the interior of the worked material. Manufacture of a shrouded impeller from individual components is simpler, however joining of the individual parts necessarily introduces the problems of suitably precise alignment of individual components (since even a small misalignment can render a rapidly rotating impeller unstable) and of implementing a suitably consistent and nonintrusive method of joining the components. Such alignment not only needs to ensure that rotating components are concentric, but also that corresponding points of mated components are in spatial alignment.

One approach to aligning the components of a shrouded impeller is to arrange the components in an alignment apparatus or jig prior to joining them, as disclosed in U.S. Pat. No. 3,257,071 (to Harris) and U.S. Pat. No. 4,155,151 (to Stiegelmeier). This approach, however, requires skilled manual adjustment of the components within the jig—a time and resource intensive process that does not lend itself to automation. In addition, aligning the components in such an apparatus does not address the problems associated with joining the aligned components by tacking, welding, or gluing.

Other approaches have attempted to align components of shrouded impellers without the use of a jig or other alignment apparatus. For example, United States Patent Application No. 2011/0,318,183 (to Noronha) describes the assembly of a complex machined component that includes a partially shrouded impeller that has an annular gap in a portion of the shroud cover. The final impeller is assembled using an annular piece dimensioned to fit into the annular gap and held in place by a frictional "snap" interface with the edges of the annular gap. This approach, however, requires complex machining processes and it is not clear how well suited the process is to shrouded impellers of various sizes. In addition, the shroud components are placed directly onto the blades during assembly.

In an alternative approach described in U.S. Pat. No. 8,128,865 (to Jahnz and Freeman), hot isostatic pressing is used to introduce a filler material between the impeller blades of a base piece. The impeller blades and filler are machined to the desired profile and a second hot isostatic pressing process is performed to attach a shroud plate to the impeller blades, after which the filler material is removed by mechanical or chemical processes. This approach still requires careful alignment, however, and the utility is limited by the need to apply considerable mechanical pressure to the relatively delicate impeller blades and by the necessity of complete removal of the filler material.

Another approach, described in U.S. Pat. No. 8,426,766, describes assembling a shrouded impeller by aligning a disc bearing a set of impeller blades with a shroud that has a set of grooves that correspond to the impeller blades. The grooves have a trapezoidal cross section, such that the free edge of an impeller blade is centered within its respective groove when the pieces are brought into contact. The two pieces can then be joined by conventional tacking and welding techniques. This approach, however, leaves a gap between the wide portion of the trapezoidal groove and the sides of the impeller blades, which can act to trap materials and make the impeller difficult to sanitize (for instance, for use in food, dairy, and pharmaceutical processing). It also does not address the problems that can arise from sub-optimal welding processes.

In another approach, described in United States Patent Application No. 2010/0,242,280 (to Adachi et al), a base with multiple resin impeller blades is produced where the impeller blades include protrusions along their free, upper edge. A frustum-shaped shroud plate is brought into contact with these protrusion, and the pieces are pressed together and vibrated to melt and fuse the blade protrusions to the shroud plate. In addition to being limited to plastic or resinous materials that are easily melted, however, this process can introduce flowed resinous material into the spaces between the impeller blades.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for robust, scalable, and automatable systems, devices, and methods for producing a multi-part shrouded impeller that provides both concentric and spatial alignment without the need for an external alignment apparatus and that supports a simple and effective joining process.

SUMMARY OF THE INVENTION

The inventive subject matter provides apparatus, systems and methods for manufacturing a shrouded impeller. The components of the impeller are machined, and include alignment features that permit concentric and spatial alignment of the components to a high degree of accuracy without the use of alignment tools and without the need for skilled manual adjustment. The shrouded impeller can be manufactured using conventional materials, tools, and techniques.

One embodiment of the inventive concept is a method of manufacturing a shrouded impeller in which a first component is machined to include a major surface and at least one impeller blade that extends from the major surface and a circumferential step that surrounds the first component. In some embodiments at least part of the impeller blade is curved. In still other embodiments the impeller blade changes in height along its length. A second component of the impeller is also machined that includes a major surface and a plurality of legs that extend from the major surface. The major surface of the second component can have a contour that matches or parallels that of the impeller blade of the first component. Such components can be machined using a cutting machine. The first component and the second component are then concentrically and spatially aligned (for example, by placing each of the plurality of legs of the second component into contact with the circumferential step of the first component), such that a gap remains between the impeller blade of the first component and the major surface of the second component. Filler material is introduced into this gap (for example, by capillary action). The filler material is fused to the impeller blade and the major surface of the second component to join the first and second component. In some embodiments of the inventive concept the joined first and second components are subsequently machined (for example, using a cutting machine) to remove at least a portion of one of the legs of the second component and/or a portion of the first component.

Another embodiment of the inventive concept is an intermediary two-part shrouded impeller. The intermediary two-part shrouded impeller includes a first machined component that has a major surface, at least three impeller blades that extend from the major surface and where each impeller blade has an apical surface, and a circumferential step in the first major surface that surrounds the impeller blades. In some embodiments of the inventive concept the impeller blades are distributed such that the distance between the midpoints of the first and second impeller blades with within 5% or less of the distance between the second impeller blade and the third impeller blade. In other embodiments, corresponding points of the impeller blades (for example, the midpoints) are coplanar. The intermediary two-part shrouded impeller also includes a second machined component with a major surface and at least two legs that extend from the major surface. The first component and the second component are configured such that when two or more legs of the second component are in contact with the circumferential step of the first component the first component and the second component are both concentrically and spatially aligned and a gap remains between an apical surface of at least one of the impeller blades and the major surface of the second component. In some embodiments of the inventive concept the gap is equal to or less than 0.2 mm. In other embodiments the gap has a tolerance of plus or minus 10%. In still other embodiments the circumferential step can be dimensioned such that engagement of the legs of the second component provides tactile feedback (such as a snap, or click).

Another embodiment of the inventive concept is a shrouded impeller, where the shrouded impeller includes a first machined component having a major surface and two or more impeller blades extending from the major surface, each impeller blade having an apical region. The shrouded impeller also includes a second machined component with a major surface, and a filler layer that lies between an apical surface of an impeller blade of the first component and the major surface of the second component. This filler layer is introduced or defined by a joining process. In some embodiments this filler layer has a thickness of less than 0.2 mm, which varies by less than plus or minus 10%. In other embodiments the filler layer has a different composition and/or microstructure from that of the first component. In still other embodiments the filler layer has a substantially identical composition and/or microstructure to that of the first component.

Another embodiment of the inventive concept is a fluid pump that incorporates a shrouded impeller, a motor that provides rotational movement to the shrouded impeller, and an outlet that is in fluid communication with the shrouded impeller. In such an embodiment the shrouded impeller includes a first machined component having a major surface and two or more impeller blades extending from the major surface, each impeller blade having an apical surface. The shrouded impeller also includes a second machined component with a major surface, and a filler layer that lies between an apical surface of an impeller blade of the first component and the major surface of the second component. This filler layer is introduced or defined by a joining process. In some embodiments the filler layer has a thickness of less than or equal to 0.2 mm, and the thickness of the filler layer varies by less than ±10%. In other embodiments the filler layer has a different composition and/or microstructure from that of the first component. In still other embodiments the filler layer has a substantially identical composition and/or microstructure to that of the first component.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1A depicts a view of the interior surface of a blade component of the inventive concept. FIG. 1B depicts a frontal view of the interior surface of a blade component, showing the distribution of blades. FIG. 1C shows a view of the exterior surface of a blade component.

FIG. 2A shows a view of the interior surface of a shroud component. FIG. 2B shows a frontal view of the interior surface of a shroud component. FIG. 2C shows a view of the exterior surface of a shroud component.

FIG. 3A shows an exterior, isometric view of the assembled components. FIG. 3B shows a cross sectional view of the assembled shroud and blade components, and illustrates the relationship between the shroud component and the blade component when alignment features are in contact. FIG. 3C is an enlarged view of a portion of FIG. 3A, showing a gap that remains between the shroud component and the blade component following initial assembly.

DETAILED DESCRIPTION

Figure 1A:
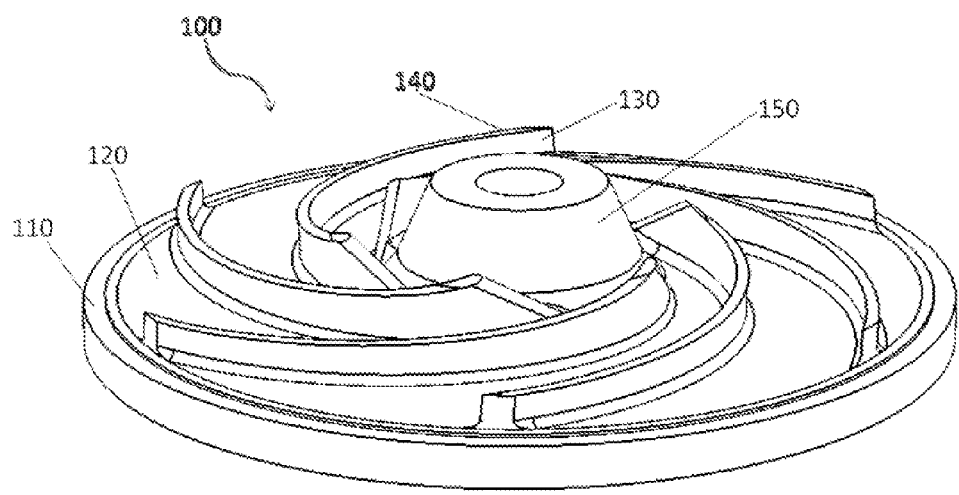
FIGS. 1A to 1C depict a blade component of the inventive concept.

The following description includes information that may be useful in understanding the present invention. It is not an admission that any of the information provided herein is prior art or relevant to the presently claimed invention, or that any publication specifically or implicitly referenced is prior art.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The problem of providing a simple method for simultaneously providing spatial (e.g., planar) and concentric alignment for the components of a shrouded impeller is addressed by providing alignment features on a blade component and a shroud component of the shrouded impeller. One alignment feature can be a step, for example a circumferential step that extends at a consistent width and to a consistent depth around the periphery of either the blade component or the shroud component of the shrouded impeller. Another alignment feature can be a plurality of supports (e.g., legs) that extend normal to the plane of either the blade component or the shroud component. Such legs are arranged around the periphery of the shrouded impeller component with which they are associated, and have consistent heights and widths (for example, a width that is similar or identical to that of the circumferential step). In one embodiment of the inventive concept legs are distributed at consistent intervals around the periphery of the shrouded impeller component and there are at least three legs. When the components of the shrouded impeller are assembled the legs contact the circumferential step, simultaneously providing concentric alignment of the blade component and the shroud component and ensuring that these two components are in spatial alignment (e.g., coplanar). It should be appreciated that these alignment features are readily produced using conventional cutting tools (e.g., lathe, mill).

The height of the legs is selected so that when engaged with the circumferential step a consistent gap remains between an apical surface of the blades of the blade component and the inner surface of the shroud component. This permits the introduction of a filler material between the blade component and the shroud component that joins these into a unitary shrouded impeller. The dimensions of the consistent gap can be selected to facilitate introduction of the filler material. For example, the dimensions of the gap can be selected to facilitate distribution of fluid filler material by capillary action; subsequent solidification of the filler material serves to securely bond the shrouded impeller components into a unitary whole.

Figure 1B:
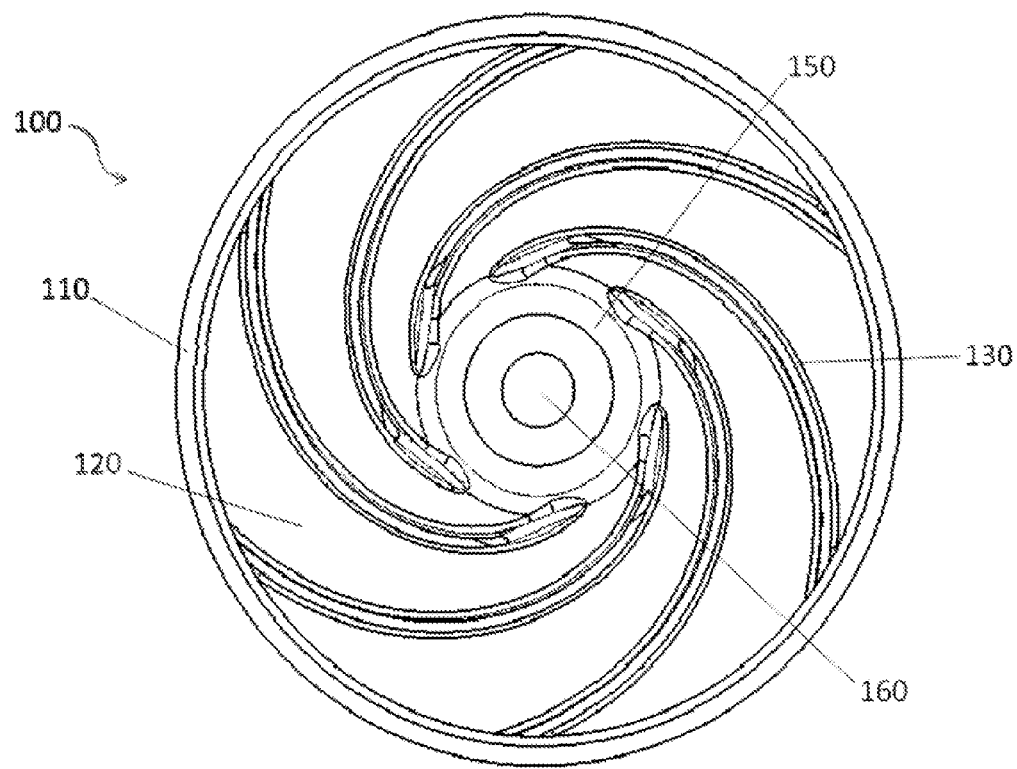
Figure 1C:
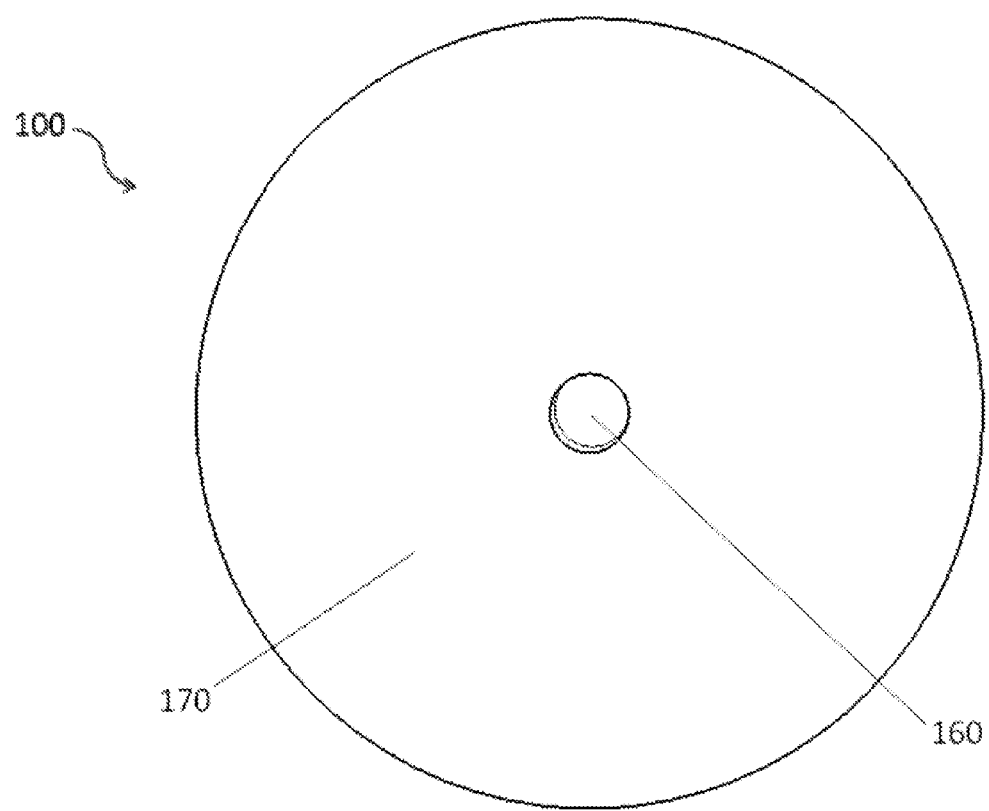

An example of a blade component of a shrouded impeller of the inventive concept is shown in FIGS. 1A to 1C. FIG. 1A depicts a view of the interior of the blade component. The blade component 100 includes a blade interior surface 120 and a circumferential step 110, which is used in alignment of the components of the impeller. Such a circumferential step 110 can be readily produced by the application of a cutting tool (e.g., lathe, mill, etc.) to the surface 120. Blade component 100 also includes one or more blades 130, which have an apical surface 140. Multiple blades 130 of blade component 100 are arranged so that the distance between corresponding portions (e.g., the midpoint) of each pair of adjacent blades 130 are essentially equivalent (e.g., within plus or minus 10% or less). Similarly, the area and/or volume defined by each pair of adjacent blades 130 is essentially equivalent. An example of the distribution of such blades can be seen in FIG. 1B, which shows a frontal view of interior surface 120. The blade component 100 can also include a central hub 150, which can include a blade central aperture 160.

Blades 130 can be curved, and can vary in height along their length. In some embodiments, blades 130 have an arcuate shape, with a curvature that increases incrementally as blade 130 approaches the central hub 150. Similarly, in some embodiments the height of a blade 130 can increase as the blade 130 approaches the central hub 150. Such exposed blades can be readily produced through the use of cutting tools using systems and devices known in the art. The exterior surface 170 of blade component 100 is shown in FIG. 1C. It should be appreciated that the exterior surface 170 of a blade component can include excess material that does not appear in the final impeller unit, but that is useful in securing and accurately machining of the blade component during manufacture, for example to a cutting tool.

Figure 2A:
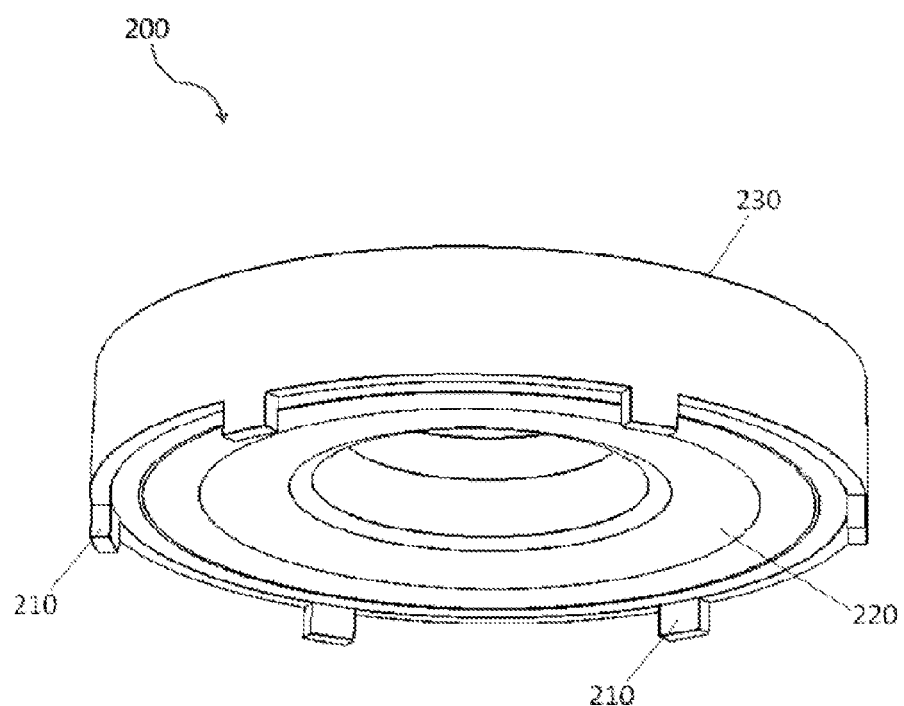
FIGS. 2A to 2C depict a shroud component of the inventive concept.
Figure 2B:
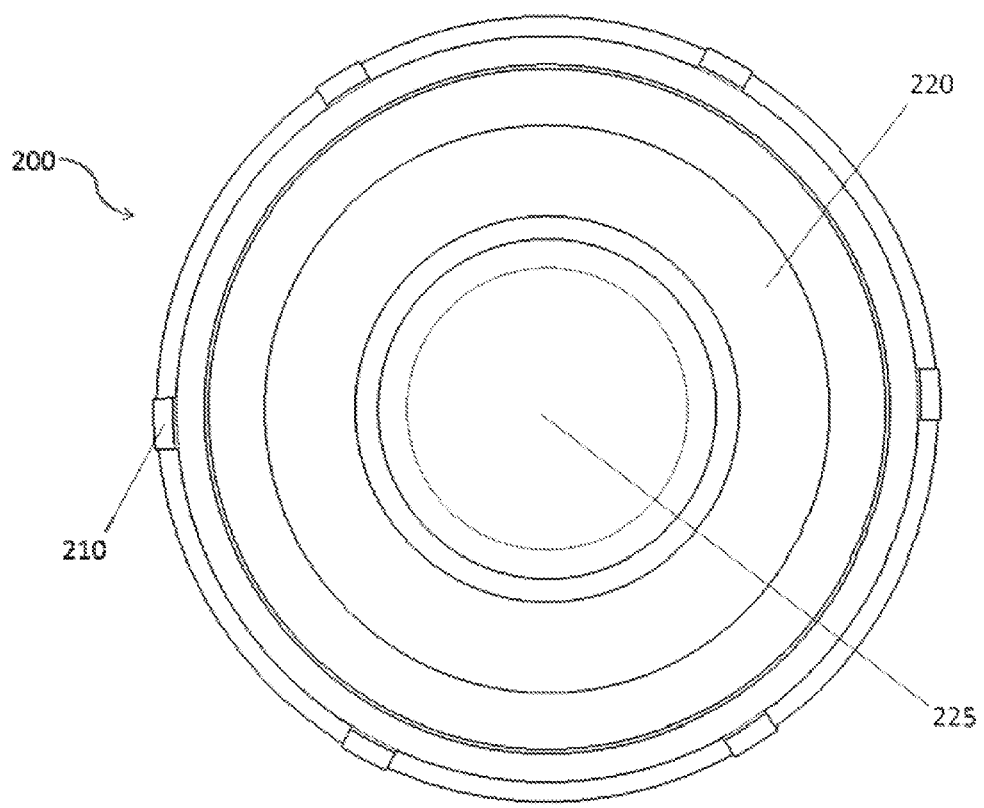
Figure 2C:
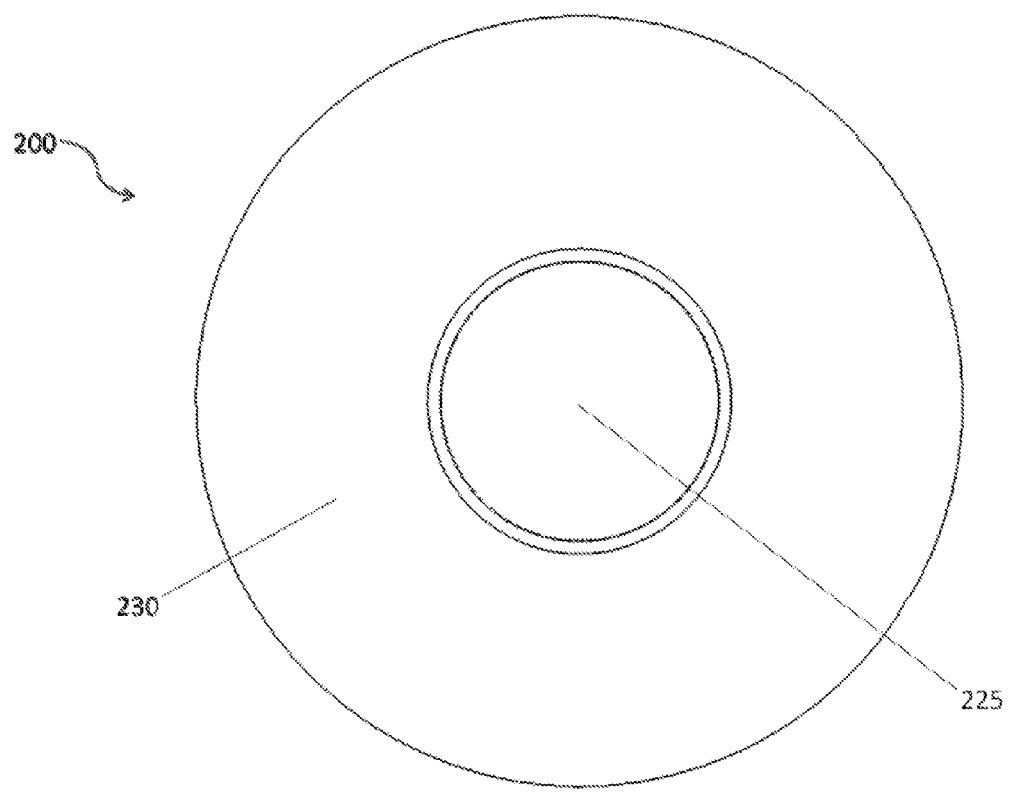

An example of a shroud component of a shrouded impeller of the inventive concept is shown in FIGS. 2A to 2C. As shown in FIG. 2A, the shroud component 200 includes one or more legs 210, which act as alignment features and a shroud interior surface 220. Multiple legs 210 can be spaced around the periphery of the shroud component 200 in an equidistant fashion. This can be seen more clearly in FIG. 2B, which depicts a frontal view of the interior surface of shroud component 200 that shows a typical distribution of legs 210 and the shroud central aperture 225. The legs 210 are dimensioned to contact the circumferential step 110 of blade component 100. For example, the sizes, dimensions, and positions of legs 210 can cooperate with the dimensions of circumferential step 110 so that when legs 210 of the shroud component 200 are in contact with circumferential step 110 of blade component 100, the blade component 100 and the shroud component 200 are both concentric and aligned spatially (e.g., coplanar).

Legs 210 can be readily produced through the use of cutting tools using methods known in the art. It should be appreciated that one, some, or all of the legs 210 can be removed during the production of the finished shrouded impeller (once blade component 100 and shroud component 200 are joined and legs 210 are no longer needed for alignment) in some embodiments. The internal face or surface 220 of the shroud component 200 can be shaped to follow the profile of the blades 130 of a matched blade component 100. The shroud component 200 can also include an external face 230, as depicted in FIG. 2C (which shows a view of the exterior surface of the shroud component). The external face 230 can be relatively bulky (e.g., including excess material not present in the finished shrouded impeller) in order to facilitate handling during manufacturing of the shroud component 200 and during production of intermediate assemblies. In some embodiments of the inventive concept such excess material is removed using a cutting tool (e.g., mill, lathe, etc.) to produce the final shrouded impeller. The deliberate inclusion of such excess material is counterintuitive since it increases the amount of waste material. However, the production of waste material is more than offset by the reduction in complexity in manufacturing of a precise and well balanced shrouded impeller thus provided. In addition, excess material removed during the final stages of manufacturing can be readily recycled.

It should be appreciated that the use of two components in the production of a shrouded impeller greatly improves manufacturability, particularly for components with complex features that must be produced with high accuracy (e.g., the blade component). Such components can be constructed from any suitable material, depending upon their intended use. Suitable materials include plastic (e.g., polypropylene, polycarbonate, and/or polyamide), resin, fluoropolymer, ceramic, metals (e.g., steel, brass, aluminum, and/or titanium), and combinations thereof. In some embodiments, components can be coated or covered with additional materials during the manufacturing process. For example, a shroud component and a blade component can be manufactured from stainless steel to their final dimensions, then receive a polymer coating. Such coatings can, for example, reduce corrosion or provide biocompatibility.

The shroud component and blade component can be manufactured from starting materials using any suitable process or combination of processes, for example molding, casting, and/or cutting from bulk material. For example, in some embodiments a shroud component can be cast in metal to an approximation of the final shape and then finished on a cutting machine. In a preferred embodiment of the inventive concept, bulk material (e.g., metal) is processed by one or more cutting machines or processes to provide a component part that is machined to high tolerances. Examples of suitable cutting processes include milling (e.g., on a milling machine, a drill, a planing machine, a router, and/or a CNC device), turning (e.g., a lathe and/or a CNC lathe), grinding (e.g., a grinder and/or a CNC grinder), and/or filing. Alternatively, electron beam machining and/or ultrasonic machining can also be used.

Figure 3A:
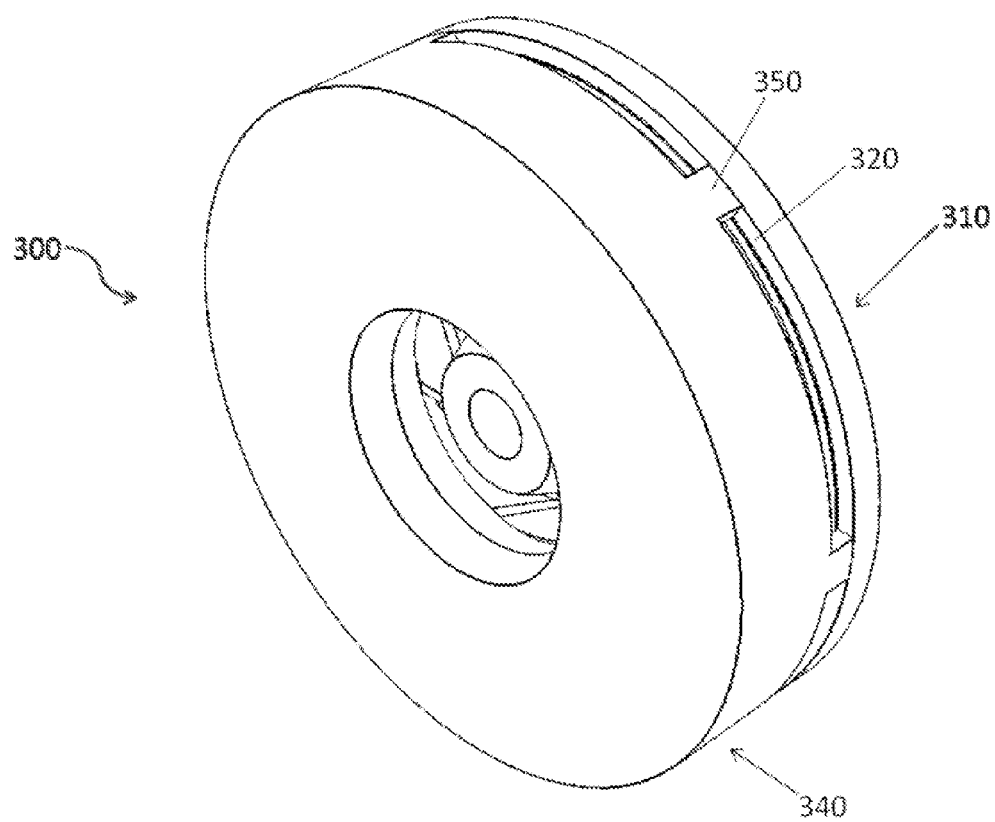
FIGS. 3A to 3C depict assembled shroud and blade components.
Figure 3B:
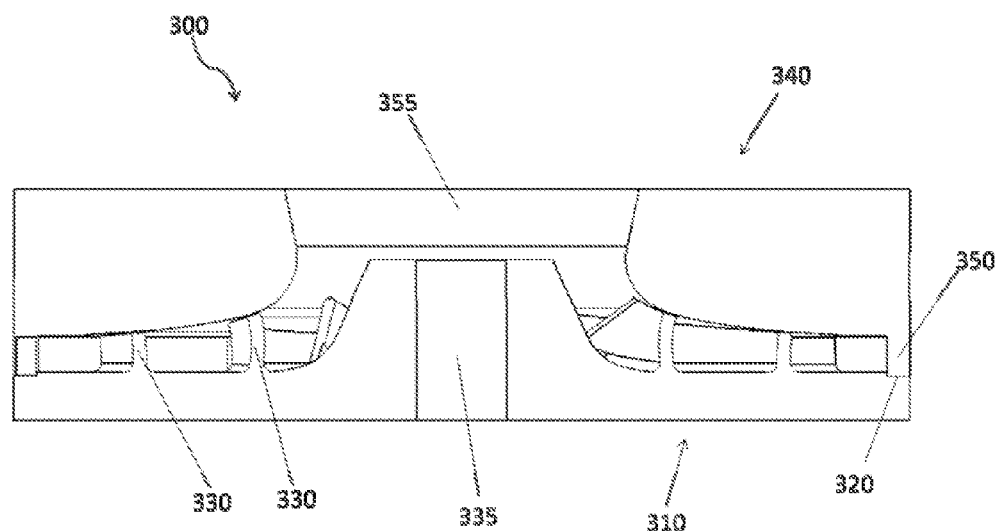
Figure 3C:
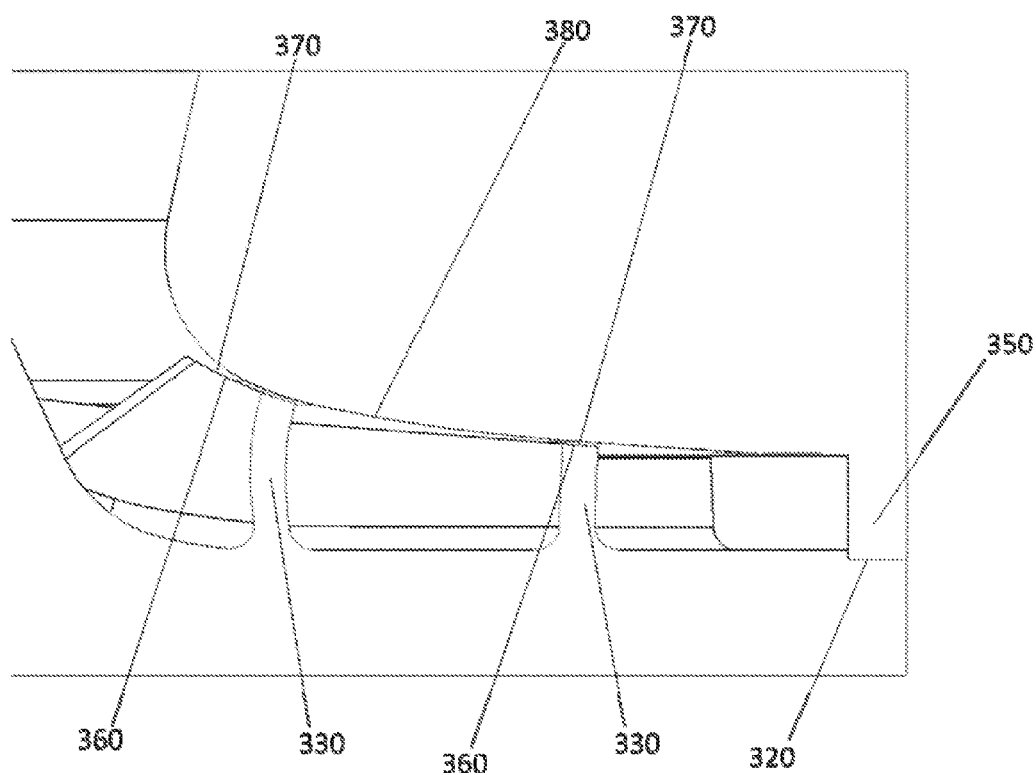

An example of an intermediate assembly of the inventive concept is shown in FIGS. 3A to 3C. FIG. 3A shows an isometric view of an intermediate assembly 300 with assembled blade 310 and shroud 340 components, with the legs 350 of the shroud component 340 in contact with the circumferential step 320 of the blade component 310. FIG. 3B depicts a cross sectional view of intermediate assembly 300, which includes a blade component 310 (in this instance, similar to that shown in FIG. 1) shown as shaded, and a shroud component 340 (in this instance, similar to that shown in FIG. 2) shown in outline form in order to display internal details. In this assembly 300, the legs 350 of the shroud component 340 have been brought into contact with the circumferential step 320 of the blade component 310. This brings the shroud component 340 and the blade component 310 into accurate concentric and spatial alignment with minimal effort and without the need for complex tools or skilled manual labor. Although not readily visible in FIG. 3B, when components 310 and 340 are aligned, a gap 370 remains between the inner surface of the shroud component 340 and the apical surface of the blades of the blade component 310. This is shown more clearly in FIG. 3C, which represents an enlarged view of such a region. As shown in FIG. 3C, when the leg 350 of the shroud component 340 is in contact with the circumferential step 320 of the blade component 310, a very thin gap 370 remains between the apical region 360 of the blade 330 and the inner surface 380 of the shroud component 340.

In some embodiments of the inventive concept the gap 370 is occupied by a filler material during manufacturing in order to join the shroud assembly and the blade assembly into a unitized whole. The dimensions of the gap can be selected to aid in the placement of the filler material. For example, the dimensions of the gap can be selected to draw in a liquid filler material by capillary action (e.g., surface activity). Such liquid filler materials can include adhesives, liquid plastics, monomers, liquid metals, particulate suspensions, or combinations of these. Once such liquid filler materials have been drawn into the gap they can be hardened or transitioned to a solid phase, for example by cooling or polymerization. In other embodiments of the inventive concept the filler can be a film or foil with an thickness that permits it to be retained within the gap. Similarly, in still other embodiments the filler can be a particulate material, where the dimensions of the particles are selected to permit retention within the gap. In such embodiments utilizing non-liquid filler materials, the filler may be transitioned to a liquid state temporarily, for example through melting, in order to bond the shroud component and the blade component. Suitable dimensions for gap representing the distance between an inner surface of the shroud component and the apical surface of a blade of the blade component can range from 0.05 mm to 10 mm. In other embodiments the gap representing the distance between an inner surface of the shroud component and the apical surface of a blade of the blade component can range from 0.1 mm to 2 mm. In a preferred embodiment, the gap representing the distance between an inner surface of the shroud component and the apical surface of a blade of the blade component is about 0.2 mm or less.

In some embodiments the liquid filler material comprises, at least in part, materials used in the construction of the shroud component and/or the blade component. For example, a shroud component and a blade component constructed of brass can be joined by introducing liquid brass metal into the gap by capillary action and permitting it to cool. The filler material in an assembled or partially assembled shrouded impeller of the inventive concept can have a similar or identical composition to that of the shroud component and/or blade component in some embodiments. In other embodiments the composition of the filler material in an assembled or partially assembled shrouded impeller of the inventive concept can be different from that of the shroud component and/or the blade component. In still other embodiments, the filler material in an assembled or partially assembled shrouded impeller of the inventive concept can have the same or similar composition to that of the shroud component and/or the blade component, but have a different microstructure (for example, a microcrystalline structure). In yet other embodiments of the inventive concept the filler material in an assembled or partially assembled shrouded impeller of the inventive concept can have the same or similar composition to that of the shroud component and/or the blade component, but have a microstructure (for example, a microcrystalline structure) that is essentially indistinguishable from that of the shroud component and/or blade component.

A unitized whole provided by the addition of the filler to the assembled shroud component and blade component can be a finished shrouded impeller, or can be an intermediate product that is processed further to provide a shrouded impeller. Such further processing can include application of cutting processes, including milling, turning, grinding and filing. These processes can be used to remove material useful for securing and/or mounting the shroud component and/or the blade component during manufacturing and assembly, but that are unnecessary or undesirable in the finished product.

Shrouded impellers of the inventive concept can be incorporated into pumps utilized for fluid handling. In such embodiments a shrouded impeller of the inventive concept is coupled with a source of rotational motion, such as a motor, engine, or drive shaft/assembly coupled to such a motor or engine. Such a connection can be a direct, mechanical connection (for example via a mechanical coupling) or can be indirect (for example, via a magnetic field). Rotation of the shrouded impeller within a fluid body pressurizes the fluid within the shrouded impeller, directing through a fluid outlet. In some embodiments the shrouded impeller is simply immersed in a body of fluid, for example through submersion on a tank or other fluid reservoir, and coupled with an appropriate drive and fluid outlet. In other embodiments, a shrouded impeller of the inventive concept is encased within a housing, which is provided with a fluid inlet that is in fluid communication with a reservoir of fluid and that includes a source of rotational motion and a fluid outlet that are coupled to the shrouded impeller.

One should appreciate that the systems and methods described herein provide a robust and reproducible method that provides impellers in which the component parts are in both spatial and concentric alignment to a high degree of precision, and that such impellers show improved stability during use and reduced wear and improved durability relative to impellers produced by prior art methods. In addition the methods described herein do not require specialized materials and can be performed using conventional machining tools, permitting manufacture of components with a degree of precision and reproducibility that cannot be achieved through casting. Following assembly, all or a portion of the alignment features (for example, the legs) can be removed. Similarly, material that is not necessary for the function of the final assembled shrouded impeller, but that has utility during the manufacturing process, can similarly be removed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

In some embodiments, the numbers expressing dimensions, properties, conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring only one element from the group, not A plus N, or B plus N, etc.

What is claimed is:

1. An intermediary two-part shrouded impeller, comprising:
    a first machined component having a first major surface, a first impeller blade extending from the first major surface and having a first apical surface, a second impeller blade extending from the first major surface and having a second apical surface, a third impeller blade extending from the first major surface and having a third apical surface, and a circumferential step on the first major surface surrounding the first impeller blade, second impeller blade, and third impeller blade;
    a second machined component having a first major surface and two or more legs extending therefrom;
    wherein the first component and the second component are configured such that contacting the two or more legs of the second machined component with the circumferential step of the first machined component leaves a gap between the first apical surface and the first major surface of the second component.

2. The intermediary two-part shrouded impeller of claim 1, wherein the gap is less than or equal to 0.2 mm.

3. The intermediary two-part shrouded impeller of claim 1, wherein the tolerance of the gap is less than or equal to plus or minus 10%.

4. The intermediary two-part shrouded impeller of claim 1, wherein the first apical surface, the second apical surface, and the third apical surface have the same height at any radial distance from a central point.

5. The intermediary two-part shrouded impeller of claim 1, wherein the first impeller blade further comprises a first midpoint, the second impeller blade further comprises a second midpoint, and the third impeller blade further comprises a third midpoint, and wherein the distance between the first midpoint and the second midpoint is within 5% of the distance between the second midpoint and the third midpoint.

6. The intermediary two-part shrouded impeller of claim 1, wherein the circumferential step of the first machined component and two or more legs of the second machined component are sized and dimensioned such that contacting the two or more legs with the circumferential step produces a tactile feedback.

7. An intermediary two-part shrouded impeller, comprising:
    a first machined component having a first major surface, a first impeller blade extending from the first major surface and having a first apical surface, a second impeller blade extending from the first major surface and having a second apical surface, a third impeller blade extending from the first major surface and having a third apical surface, and a circumferential step on the first major surface surrounding the first impeller blade, second impeller blade, and third impeller blade;

a second machined component having a first major surface and two or more legs extending therefrom;

wherein the first component and the second component are configured such that contacting the two or more legs of the second machined component with the circumferential step of the first machined component concentrically aligns the first component and the second component.

8. The intermediary two-part shrouded impeller of claim 7, wherein the component and the second component are further configured such that contacting the two or more legs of the second machined component with the circumferential step of the first machined component spatially aligns the first component and the second component.

\* \* \* \* \*